United States Patent
Martinsson et al.

(10) Patent No.: US 11,135,665 B2
(45) Date of Patent: Oct. 5, 2021

(54) HANDHELD POWER TOOL

(71) Applicant: HUSQVARNA AB, Huskvarna (SE)

(72) Inventors: Pär Martinsson, Jönköping (SE); Johan Hallendorff, Jönköping (SE); Tomas Wykman, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 15 days.

(21) Appl. No.: 16/089,085

(22) PCT Filed: Mar. 29, 2017

(86) PCT No.: PCT/EP2017/057366
§ 371 (c)(1),
(2) Date: Sep. 27, 2018

(87) PCT Pub. No.: WO2017/167783
PCT Pub. Date: Oct. 5, 2017

(65) Prior Publication Data
US 2019/0061028 A1 Feb. 28, 2019

(30) Foreign Application Priority Data
Mar. 31, 2016 (SE) .................... 1650423-5

(51) Int. Cl.
B23D 59/00 (2006.01)
B27B 17/00 (2006.01)
(Continued)

(52) U.S. Cl.
CPC ........... *B23D 59/002* (2013.01); *A01G 23/08* (2013.01); *A01G 23/083* (2013.01);
(Continued)

(58) Field of Classification Search
CPC .. B23D 59/002; B23D 59/001; B23D 59/008; A01G 23/08; A01G 23/083; A01G 23/091; B27B 17/00; B27B 17/0025; G07C 3/00
See application file for complete search history.

(56) References Cited

U.S. PATENT DOCUMENTS 4,534,005 A * 8/1985 Nagashima .......... B23D 59/008
184/6.1
5,143,131 A 9/1992 Seigneur et al.
(Continued)

FOREIGN PATENT DOCUMENTS

DE 10 2004 046 000 B4 7/2016
JP 2008-065720 A 3/2008

OTHER PUBLICATIONS

Notice and International Type Search Report for Swedish Application No. 1650423-5 dated Nov. 16, 2016.
(Continued)

*Primary Examiner* — Jonathan G Riley
(74) *Attorney, Agent, or Firm* — Burr & Forman, LLP

(57) ABSTRACT

A handheld power tool (100) comprising at least one orientation sensor (150) is provided. The handheld power tool (100) is operatively connected to a controller (160; 210) and said controller (160; 210) is configured to receive orientation data from the at least one orientation sensor (150), wherein the orientation data comprises information associated with an orientation of at least a portion of the handheld power tool (100) and to determine operational data based on the orientation data, said operational data representing work performed using the handheld power tool (100). The operational data is determined by determining the orientation of the power tool based on the received orientation data from the at least one orientation sensor (150).

18 Claims, 5 Drawing Sheets

(51) Int. Cl.
  *A01G 23/08*    (2006.01)
  *A01G 23/083*   (2006.01)
  *A01G 23/099*   (2006.01)
  *B27B 17/12*    (2006.01)

(52) U.S. Cl.
  CPC ......... *A01G 23/099* (2013.01); *B23D 59/001* (2013.01); *B23D 59/008* (2013.01); *B27B 17/00* (2013.01); *B27B 17/0025* (2013.01); *B27B 17/12* (2013.01)

(56) References Cited

U.S. PATENT DOCUMENTS

| | | | |
|---|---|---|---|
| 6,463,352 B1 | 10/2002 | Tadokoro et al. | |
| 2009/0251330 A1* | 10/2009 | Gerold | B25C 1/08 340/12.22 |
| 2009/0254203 A1* | 10/2009 | Gerold | B25C 1/08 700/87 |
| 2010/0064532 A1* | 3/2010 | Wittke | B27G 19/003 30/382 |
| 2010/0065155 A1 | 3/2010 | Peltomae et al. | |
| 2010/0224610 A1 | 9/2010 | Wallace | |
| 2010/0257743 A1* | 10/2010 | George | B27B 17/083 30/383 |
| 2012/0036725 A1* | 2/2012 | Osborne | B27B 17/083 30/383 |
| 2013/0068743 A1 | 3/2013 | Delin et al. | |
| 2015/0135306 A1* | 5/2015 | Winkler | B25F 5/00 726/17 |
| 2015/0286209 A1 | 10/2015 | Kreuzer | |
| 2015/0360305 A1 | 12/2015 | Willgert | |
| 2016/0071383 A1 | 3/2016 | Baldwin et al. | |
| 2017/0000045 A1* | 1/2017 | Linder | A01G 23/081 |
| 2018/0133822 A1* | 5/2018 | Naganuma | B23D 63/168 |
| 2019/0011270 A1* | 1/2019 | Frey | A01G 23/095 |
| 2019/0227528 A1* | 7/2019 | Abbott | G06N 20/00 |
| 2020/0276680 A1* | 9/2020 | Green | H02K 7/14 |

OTHER PUBLICATIONS

International Search Report and Written Opinion for International Application No. PCT/EP2017/057366 dated Jun. 16, 2017.
International Preliminary Report on Patentability for International Application No. PCT/EP2017/057366 dated Oct. 2, 2018.

* cited by examiner

HANDHELD POWER TOOL

TECHNICAL FIELD

This application relates to an improved handheld power tool and more specifically a handheld power tool that automatically provides information relating to the work being done.

BACKGROUND

Handheld power tools are commonly used in both commercial and private settings to cut, saw or in other ways remove material. Handheld power tools may for example be used in forestry for removing unwanted trees or bushes or in gardening applications such as cutting high grass or hedges.

When using a handheld power tool in forestry it is beneficial to keep track of the amount of threes being felled, where the felled trees are located, amount of time spent using the working tool and/or the price earned for each tree. Today the operator has to manually write down and calculate this information based on its own knowledge of the work. This is tiresome and time-consuming for the operator as well as the information can be inaccurate due to human errors.

There is thus a need for an improved handheld power tool system.

SUMMARY

It is an object of the teachings of this application to overcome the problems listed above by providing a handheld power tool comprising at least one orientation sensor. The handheld power tool is operatively connected to a controller, wherein said controller is configured to receive orientation data from the at least one orientation sensor, wherein the orientation data comprises information associated with an orientation of at least a portion of the handheld power tool and to determine operational data based on the orientation data, said operational data representing work performed using the handheld power tool, wherein operational data is determined by determining the orientation of the power tool based on the received orientation data from the at least one orientation sensor.

It is also an object of the teachings of this application to overcome the problems listed above by providing a method for use in a handheld power tool comprising at least one orientation sensor, wherein the handheld power tool is operatively connected to a controller. The method comprises receiving orientation data from the at least one orientation sensor, wherein the orientation data comprise information associated with an orientation of at least a portion of the handheld power tool, and determining operational data based on the orientation data, said operational data representing work performed using the handheld power tool, wherein operational data is determined by determining the orientation of the power tool based on the received orientation data from the at least one orientation sensor.

It is also an object of the teachings of this application to overcome the problems listed above by providing a mobile telephone comprising a controller and a wireless interface. The controller is configured to establish a connection to a handheld power tool and to determine operational data based on orientation data, wherein the controller receives the orientation data in a partially processed state or unprocessed state.

The inventors of the present invention have realized, after inventive and insightful reasoning that by utilizing an orientation sensor in a handheld power tool, operational data may be generated which is used to provide feedback to the user and/or other persons connected to the power tool.

In one embodiment the orientation data from the orientation sensor is combined with data associated with throttling or revving information to determine that the chainsaw is actually being used for cutting the trunk of a tree, i.e. used for felling a tree.

One benefit is that the operator or supervisor may receive operational data relating to the daily work. This data may for example be useful to improve the efficiency and planning. The data may relate to the amount of threes being felled, where the felled trees are located, amount of time spent using the working tool and/or the price earned for each tree.

Another benefit is that persons not being in the working area can receive information regarding the work that is being done. This is beneficial information for example a manager of a foresting company having workers felling trees in different areas and who wants to keep track of their progress. It may also be beneficial information for forest owners that hires operators to fell trees, and where the owner wants to see if the work is being done on time etc.

Yet a further benefit is that the nearby operators may be warned when a power tool is an active state in a nearby area. This will decrease the risk of accidents.

Other aspects are defined by the appended patent claims and are further explained in the detailed description section as well as in the drawings.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
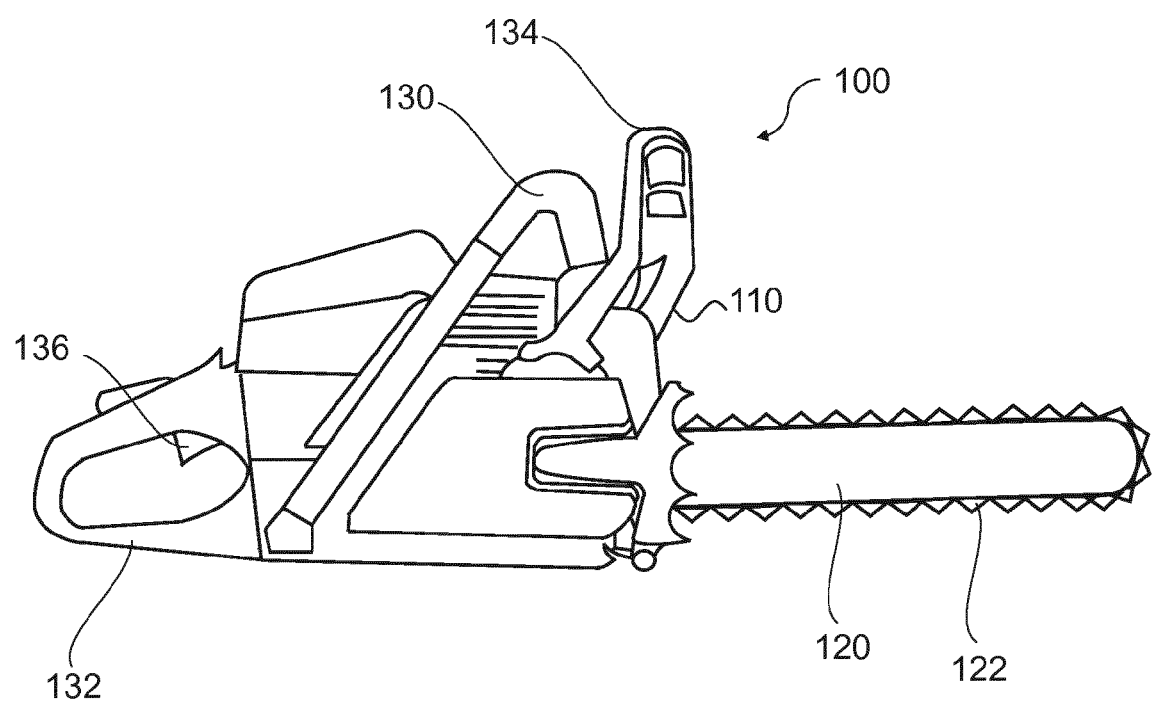
FIG. 1 shows a schematic view of a handheld power tool according to one embodiment of the teachings of this application.

FIG. 1 shows a handheld power tool 100 in the form of a chainsaw. It should be appreciated that the chainsaw 100 is merely one example of power equipment that includes a working assembly. Thus, example embodiments could also be practiced in connection with some other power equipment that may include working assemblies of different types such as power tools used for cutting a variety of materials such as wood, concrete, metal and the like. The handheld power tool 100 could also be a power saw, a cut off saw, a sander or other suitable power tools. As seen in FIG. 1 the chainsaw 100 may include a housing 110. A power unit (not shown) is arranged inside the housing 110 and in some embodiments, the power unit may be either an electric motor or an internal combustion engine.

The chainsaw 100 may further include a guide bar 120 that is attached to the housing 110 along one side thereof. A chain 122 may be driven around the guide bar 120 responsive to operation of the power unit in order to enable the chainsaw 100 to cut timber or other materials. The guide bar 120 and the chain 122 may form the working assembly of the chainsaw 100.

The housing 110 may include a fuel tank for providing fuel to the power unit via removal of fuel cap. The housing 110 may also include or at least partially define an oil reservoir, access to which may be provided to allow the operator to pour oil into the oil reservoir. The oil in the oil reservoir may be used to lubricate the chain 122 as the chain 122 is turned.

The chainsaw 100 may include a front handle 130 and a rear handle 132. A chain brake and front hand guard 134 may be positioned forward of the front handle 130 to stop the movement of the chain 122 in the event of a kickback. In an example embodiment, the hand guard 134 may be tripped by rotating forward in response to contact with a portion of the arm (e.g., the hand/wrist) of the operator of the chainsaw 100. In some cases, the hand guard 134 may also be tripped in response to detection of inertial measurements indicative of a kickback.

The rear handle 132 may include a trigger 136 to facilitate operation of the power unit when the trigger 136 is actuated. In this regard, for example, when the trigger 136 is actuated (e.g., depressed), the rotating forces generated by the power unit may be coupled to the chain 122 either directly (e.g., for electric motors) or indirectly (e.g., for gasoline engines). The term "trigger," as used herein, should be understood to represent any actuator that is capable of being operated by a hand or finger of the user. Thus, the trigger 136 may represent a button, switch, or other such component that can be actuated by a hand or portion thereof.

Some power units may employ a clutch to provide operable coupling of the power unit to a sprocket that turns the chain 122. In some cases (e.g., for a gasoline engine), if the trigger 136 is released, the engine may idle and application of power from the power unit to turn the chain 122 may be stopped. In other cases (e.g., for electric motors), releasing the trigger 136 may secure operation of the power unit.

Actuation of the trigger 136 may initiate movement of the chain 122 around the guide bar 120. Meanwhile, at least two different events may cause the movement of the chain 122 around the guide bar 120 to be interrupted or stopped. In this regard, for example, release of the trigger 136 and tripping of the hand guard 134 may cause movement of the chain 122 around the guide bar 120 to be stopped.

Figure 2A:
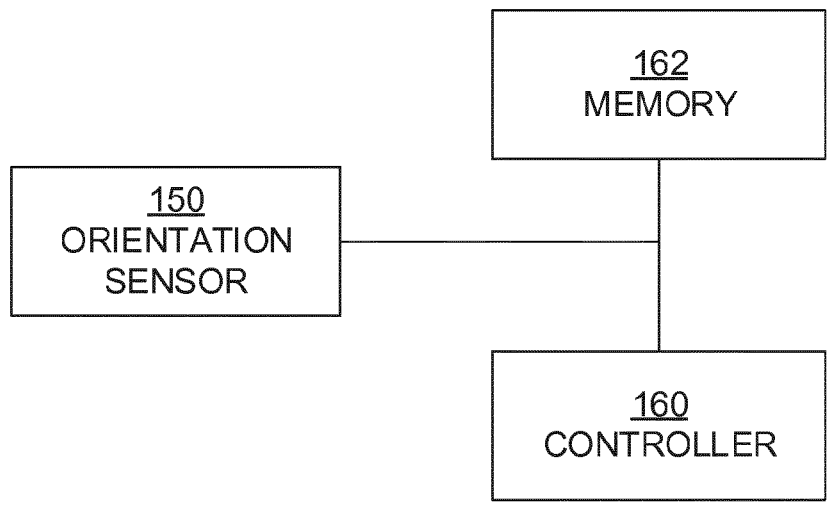
FIGS. 2a-b each shows a schematic view of a chainsaw according to two embodiments of the teachings of this application.

In FIG. 2a, further parts of the chainsaw 100 are shown. In this embodiment the chainsaw also comprises at least one orientation sensor 150 arranged to detect an orientation of the chainsaw 100 or an orientation of at least a portion of the chainsaw 100 (e.g. the guide bar 120, the handle 132 and/or the chain brake). The orientation sensor 150 is connected to a memory 162. The orientation sensor is configured to generate orientation data comprising information associated with an orientation of at least a portion of the chainsaw 100.

The orientation sensor 150 may be a gyroscope, an accelerometer, a capacitive sensor and/or a piezoelectric sensor. It is beneficial if the sensor is small and easily integrated in the chainsaw 100, either internally or externally. In one embodiment the orientation sensor 150 is externally arranged on the chainsaw. The sensor 150 may for example be arranged on a housing arranged in conjunction to the handle of the chainsaw 100 or arranged in conjunction with the handle or trigger.

In one embodiment the orientation sensor 150 is arranged inside the guide bar 120 in the working assembly of the chain saw, to accurately determine the orientation of the chain 122. In yet another embodiment the orientation sensor 150 is arranged inside the housing 110 in conjunction to the power unit to for example determine operational efficiency data associated with information relating to the power consumption.

In one embodiment the orientation sensor 150 is positioned on the outside of the guide bar 120. The orientation sensor 150 may be configured to wirelessly communicate information, such as orientation data, to the controller 160 (for example arranged in a smart phone 200). The orientation sensor 150 may be a retrofit device suitable for use on existing or conventional chainsaws, such that it can be attached to the outside of the chainsaw and then transmit orientation data to a controller, for example arranged in a smart phone 200.

In yet one embodiment, two orientation sensors 150 are arranged in the chainsaw 100, one in the guide bar 120 and one inside or on the housing 110 of the chainsaw 100. Where two or more sensors 150 are used, the first and the second sensor do not need to be of the same kind.

The orientation sensor 150 is able to generate sensors signals relating to changes in direction or acceleration, for example caused by the operator changing the position of the chainsaw 100 (or a portion thereof) during cutting. Output generated from the orientation sensor 150 is orientation data that may be highly relevant information in order to generate knowledge of the use of the chainsaw 100. The orientation data may be associated with information relating to changes in angle and/or direction. The orientation data comprises information associated with an orientation of at least a portion of the chainsaw 100. The angle and/or inclination in question is relative to a reference point, such a reference point may for example be the ground, a level position, a horizontal plane, etc.

Figure 2B:
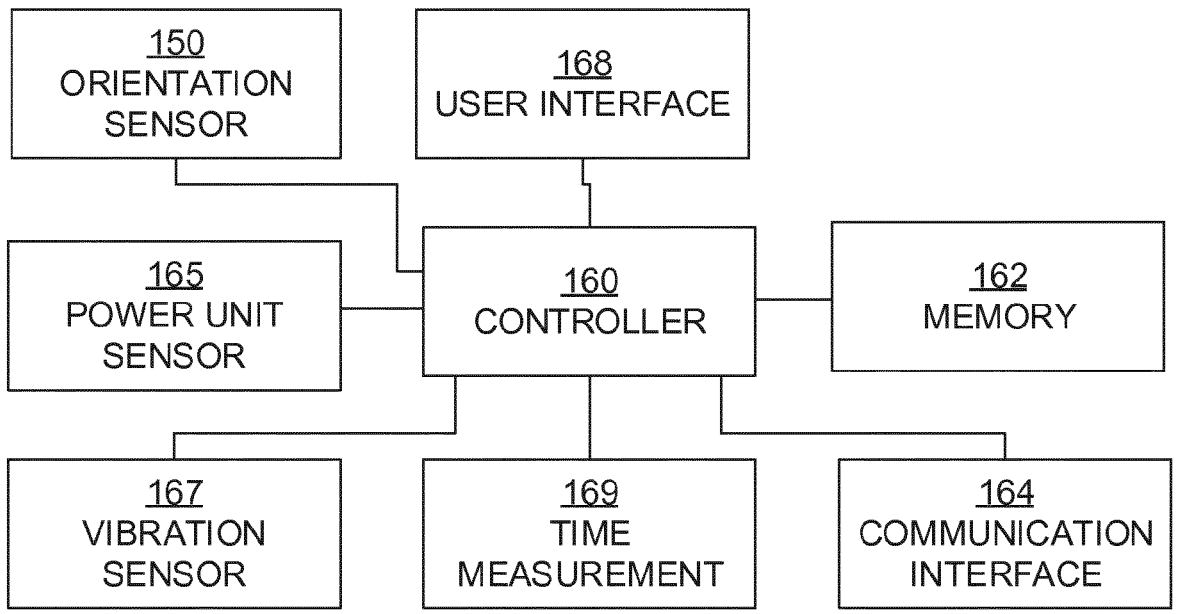

The parts of the chainsaw shown in FIGS. 2a-b may be operatively connected to each other via wireless or wireline connection.

The controller 160 may be implemented using instructions that enable hardware functionality, for example, by using executable computer program instructions in a general-purpose or special-purpose processor that may be stored on a computer readable storage medium (disk, memory etc.)

162 to be executed by such a processor. The controller 160 is configured to read instructions from the memory 162 and execute these instructions to control the operation of the chainsaw 100. The controller 160 may be implemented using any suitable, publically available processor or Programmable Logic Circuit (PLC). The memory 162 may be implemented using any commonly known technology for computer-readable memories such as ROM, RAM, SRAM, DRAM, FLASH, DDR, SDRAM or some other memory technology.

The controller may be a dedicated controller or the controller may also be configured to control other functions.

Figure 3A:
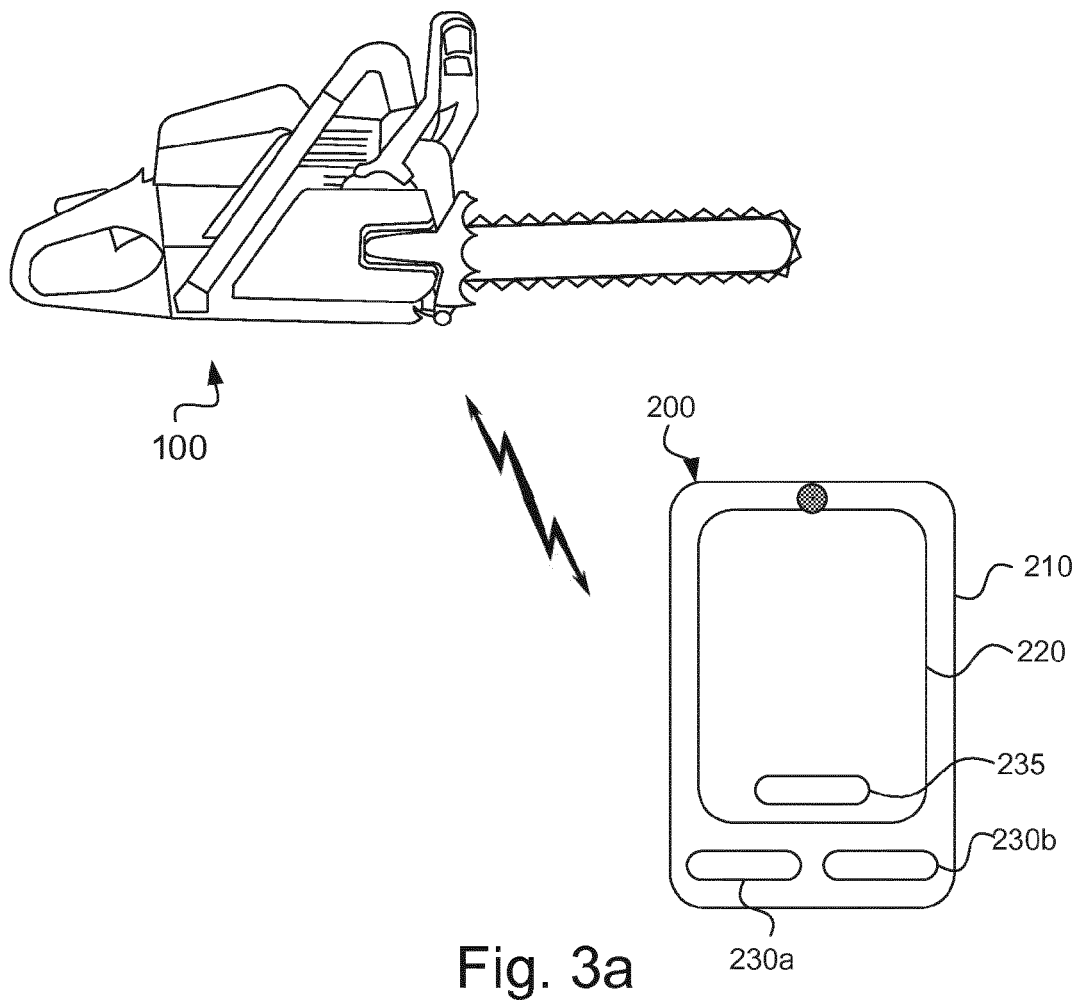
FIG. 3a shows a schematic view of a communication system according to one embodiment of the teachings of this application and FIG. 3b shows a schematic view of a mobile terminal according to one embodiment of the teachings of this applications.

In one embodiment the controller may be configured to collect information including partial processing, such as formatting, for transmittal to another controller (possibly external) for final processing. One example is where the controller of the chainsaw is in communicative contact with a controller of for example a smart phone 200 (as seen in FIG. 3) and wherein the final processing is performed in the smartphone.

FIG. 2b shows additional parts of one embodiment of a chainsaw 100. In one embodiment the controller 160 is connected to the power unit for controlling the operation of the chainsaw 100 which enables the controller to collect information relating to the work done by the chainsaw 100. The controller 160 is also configured to determine the load exerted on the chain 122, by for example measure the power delivered to the motor or by measuring the axle torque exerted by the chain.

In one embodiment the chainsaw 100 further comprises a power unit sensor 165 which is able to generate information relating to the number of revolutions and/or the power used (herein after called the operating efficiency data). Information of the number of revolutions could also be measured from a photodetector or the like. With that information, the controller 160 calculates the revolutions per minute (RPM) of the power unit of the chainsaw 100. Different predetermined RPM thresholds may be applied; so that the operational efficiency data contain information relating to if the RPM is low, medium or high.

If the number of revolutions per minute is decreasing even though the chainsaw 100 is using its full power, this indicates that the chainsaw is cutting (i.e. work is being done). This information may be stored as an operational data to show the total time the chainsaw 100 being used to cut trees. If this data is combined with orientation data obtained from the orientation sensor 150 it is possible to gain operational data such as if the chainsaw 100 is felling tree or cutting of the branches of the log.

Furthermore, the chainsaw 100 may comprise a clock or a time measurement system 169. This allows for generating time data containing information associated with time measurement. For example, the time at full power (or above a threshold) may be measured which can be used to determine operational data such as the amount of work that has been done, that is the work is equal to the effect divided by time.

The chainsaw 100 may further comprise a vibration sensor 167 which is able to generate information relating to the vibration patterns caused during use of the chainsaw 100.

The chainsaw 100 further comprises a communication interface 164, which is adapted to allow the chainsaw 100 to communicate with other devices through the use of different communication technologies. Such communication technologies may be wired or wireless. Examples of such wired technologies are Universal Serial Bus (USB) and Ethernet to name a few. Examples of such wireless technologies are IEEE 802.11, IEEE 802.15, ZigBee, WirelessHART, WIFI, Bluetooth®, W-CDMA/HSPA, GSM, UTRAN and LTE to name a few. It should be noted that other technologies exist and are taken to be an obvious equivalent for such wireless communication interfaces.

The chainsaw 100 may further comprise or be operatively connected to a position determining device. In one embodiment the position determining device is a Global Positioning System (GPS). However, it should be noted that in other embodiments the position determining device may also be a Radio Frequency Identification (RFID) tag or a Real-time Locating System (RTLS) tag. Reference to a position determining device should be understood to mean any means by which a location relative to a base position may be determined and that reference to location may mean proximity, direction, or a combination thereof.

In one embodiment the chainsaw comprises the position determining device. In one embodiment, the controller is operatively connected to a position determining device, meaning that the position data received from the position determining device is combined with the other data during pre-processing or final processing. One example of such an embodiment is where an external position determining device is being used, such as that of a smartphone 200.

The output from the position determining device may also be data that could be obtained and received by the controller. The position data generated from the position determining device provides information so that the position of the chainsaw and its operator can be determined. The position data obtained during the use of the chainsaw 100 may be sent from the communication interface 164 in the chainsaw 100 to a mobile terminal 200 such as a mobile phone, tablet, computer or the like where the operational data is generated. Such a system is shown in FIG. 3, where mobile terminal 200 is in communicative connection with chainsaw 100. Here the mobile terminal 200 is shown in the form of a mobile phone.

The mobile phone 100 comprises a housing 210 in which a display 220 is arranged. In one embodiment the display 220 is a non-touch display. In other embodiments the display 220 is a touch display. Furthermore, the mobile phone 200 comprises two hard-wired keys 230. In this embodiment there are two softkeys 230a and 230b, but any number of keys, including none, is possible and depends on the design of the mobile phone 200. In one embodiment the mobile phone 200 is configured to display and operate a virtual key 235 on the touch display 220. It should be noted that the number of virtual keys 235 are dependent on the design of the mobile phone 200 and an application that is executed on the mobile phone 200.

Figure 3B:
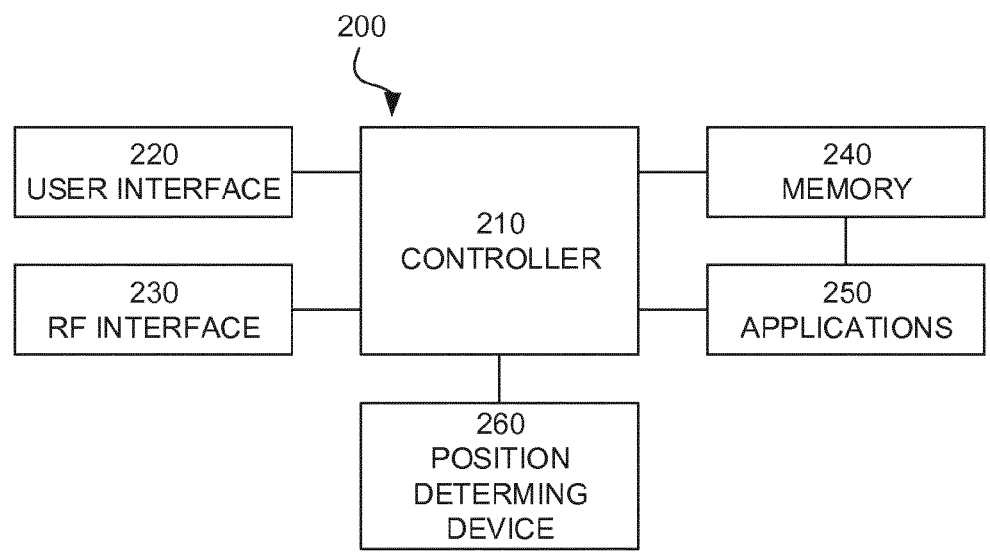

The mobile terminal 200 may further comprises a user interface 220, a radio frequency interface 230, a controller 210, a memory 240, applications 250 and a position determining device 260 as is seen in FIG. 3b.

The user interface is in the mobile phone of FIG. 3 is comprised of the display 220, the keys 230, 235, a microphone and a loudspeaker. The user interface (UI) also includes one or more hardware controllers, which together with the user interface drivers cooperate with the display 220, keypad 230, as well as various other I/O devices such as vibrator, ringtone generator, LED indicator, etc. As is commonly known, the user may operate the mobile terminal through the man-machine interface thus formed.

As previously mentioned, the mobile phone 200 further comprises a controller 210 which is responsible for the overall operation of the mobile terminal and is preferably implemented by any commercially available CPU ("Central Processing Unit"), DSP ("digital signal processor") or any other electronic programmable logic device, or a combination of such processors and/or other electronic programmable logic device. The controller 210 is configured to read instructions from a memory and execute these instructions to control the operation of the mobile terminal 200.

The software modules include a real-time operating system, drivers for a user-machine interface, an application handler as well as various applications. The applications 250 are sets of instructions that when executed by the controller control the operation of the mobile terminal 200. The applications 250 can include a messaging application for short messaging service (SMS), multimedia messaging service (MMS) and electronic mail, a media player application, as well as various other applications, such as applications for voice calling, video calling, web browsing, document reading and/or document editing, an instant messaging application, a phonebook application, a calendar application, a control panel application, one or more video games, a notepad application, location finding applications, etc.

The mobile terminal 200 may further comprise a radio frequency interface 230, which is adapted to allow the mobile communications terminal to communicate with other communications terminals in a radio frequency band through the use of different radio frequency technologies. Examples of such technologies are W-CDMA, GSM, UTRAN, LTE and NMT to name a few. The controller 210 is configured to operably execute the applications 250, such as the voice call and message handling applications, through the RF interface and software stored in the memory.

As previously mentioned the mobile phone 200 may further comprise a position determining device 260, as already been described.

The communication interface 164 of the chainsaw 100 transmits data (such as orientation data, position data, time data, vibration data, operational efficiency data, etc.) to the mobile terminal using wireless communication. The gained data could for example be uploaded in an application or webpage in a mobile phone belonging to the operator, the manager or the forest owner. In this way the work progress of the tree felling could be tracked. The application or webpage in the mobile device may retrieve the data to generate operational which for example could be used to create a map of the progress, e.g. by drawing up using GPS-information where each tree has been felled.

The data (such as orientation data, position data, time data, vibration data, operational efficiency data, etc.) discussed herein may be used in different combinations in order to generate desirable operational data which is relevant to the operator, the manager and/or the owner of the forest. The operational data may for example comprise information relating to the work done, remaining work, a map of the cleared area, a map of an area where work is still needed, the thickness of the trees that had been felled, a price estimate of the trees being felled and/or an approximation of the calorie consumption of the operator.

Figure 4A:
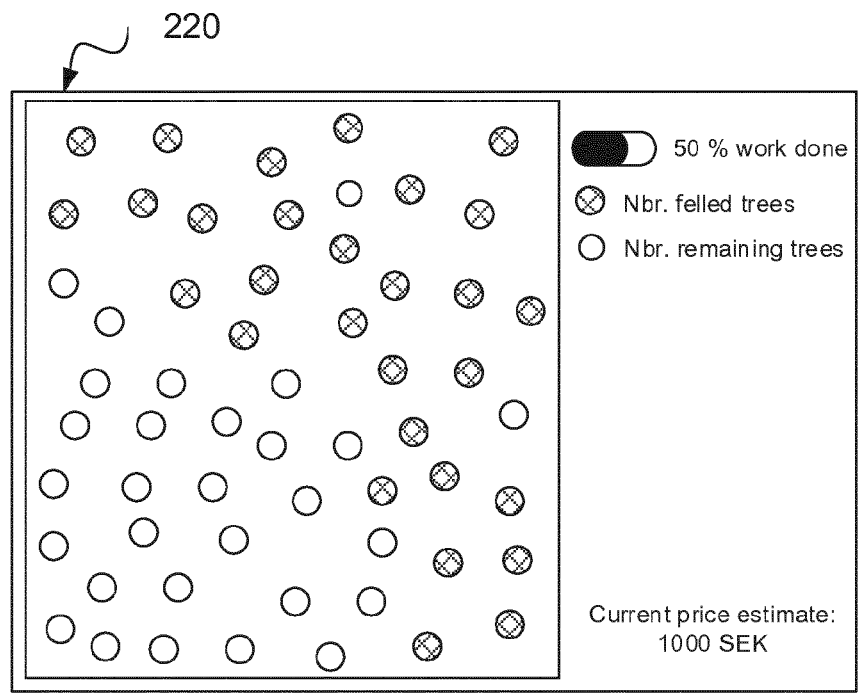
FIGS. 4a-b each shows an exemplified view of a display showing operational data according to one embodiment of the teachings of this application.
Figure 4B:
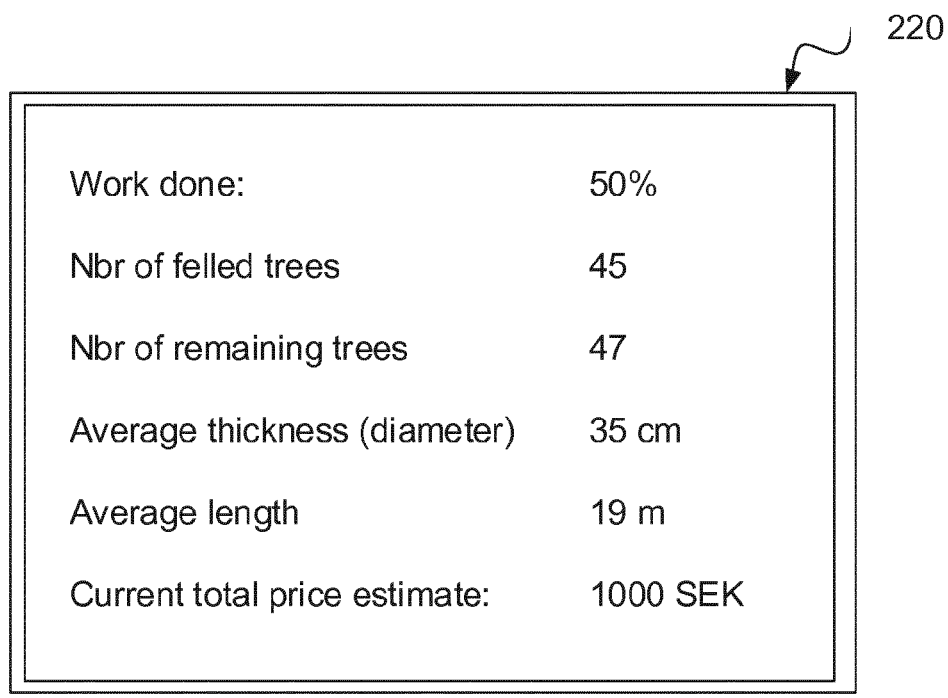

In one embodiment the operational data is shown to the user through the display of the mobile phone. The operational data may be shown as a table presenting the information or as a map graphically showing at least some of the information, as seen in FIGS. 4a-b. An exemplified view of how the presentation of the operational data to the user on the display of the mobile phone may look like is seen in FIG. 4a. In this exemplified view, the number of felled trees and the number of remaining trees are shown both graphically in a map and as information in text form. In addition thereto, the percentage of work done is presented as well as an estimate price of the wood being felled. In FIG. 4b a table is shown presenting different operational data regarding the use of the chainsaw 100. In this exemplified figure the information presented is: percentage of work being done, number of felled trees, number of remaining trees, average thickness of the trees being felled, average length of the trees being felled and the current total price estimate of the trees being felled.

As already discussed above, the conversion of data (relating to orientation, position data, time, vibration and/or operational efficiency) into operational data is conducted by a controller. Preferably, the controller in the mobile terminal 200 is used. Different operational data could be obtained by using different combinations of data. The different data may be weighted differently compared to each other, so that for example data orientation has more influence on the generated operational data than for example vibration data.

Non-limiting examples of how different data can be used to distinguish between different operating modes of the chainsaw 100 will now be described. The different operating modes may relate to what kind of work the chainsaw is used for; such as hinged cuts, felling cuts, limbing or bucking. This information may be useful to generate operational data such as the thickness and/or length of the trees being felled, the location of the felled tree and possible how the thickness of the tree varies with the length of the same.

The process of felling trees involves several steps and it is thus beneficial to be able to distinguish between these steps when processing the data relating to the work with the chainsaw 100. In order to control the fall of the tree to be cut, it is common to use three main cuts. First two directional, or hinged, cuts are preformed, one at the top and one at the bottom of the tree to cut out a wedged-shaped piece. This will create a hinge that will steer the tree into the desired felling direction as a felling cut is performed. In an optional step, a wedge is placed inside the cut to bear the load. This step may also be used after the next step. In the next step a horizontal felling cut is made from the opposite side of the wedge. When the hinge is properly set, the felling cut will begin the fall in the desired direction. Once the three has fallen to the ground, it is beneficial to remove all the branches of the log. This step is called limbing. Some of the lower branches of the tree could also be cut before felling the tree. A final optional step is cross cutting the felled log into sections, so called bucking. The above described steps could thus be seen as different operating modes.

In one embodiment, the controller of either the chainsaw 100 or the mobile terminal 200 is capable of distinguishing between a first operating mode, a second operating mode and a third operating mode, which may be beneficial in order to determine operational data such as the amount of work being done. These operating modes may be determined by several data, such as orientation data associated with inclination of the chainsaw while being turned on inclination of the chainsaw while cutting, time data associated with the time spent cutting at a certain power level, vibration data, position data such as GPS-information and/or the recent activation history.

The first operating mode concerns the step of the directional cuts or hinging, where two side cuts are made to create a hinge. This information may be useful when calculating the thickness of the tree being felled, since a hinged always is cut at a predetermine distance in relation to the thickness of the tree. In one embodiment the first operating mode is determined by the inclination of the chainsaw. In order to cut a hinge, two cuts having different inclination angle needs to be performed at substantially the same position. For example, the first cut may be made by bringing the saw downwards at an angle of 65 degrees with respect to the longitudinal extension of the tree trunk and the second cut is performed by bringing the saw upwards at an angle of 30 degrees with respect to the tree or horizontally. The first operating mode is detected once the orientation sensor 150 (possibly in combination with the power unit sensor) detects the two following cuts having different inclination which is within a predetermined threshold. The threshold could for example be between 60 to 70 degrees and 25 and 35 degrees (or −10 to 10 degrees) relative a reference point, respectively. Such a reference point may be relative to level ground. It should be recognized that the threshold could vary significantly depending on user settings.

In one embodiment the first operating mode is determined using orientation data, as described above, together with time data. The time the chainsaw 100 is an inclined and active state, e.g. working with directional cuts, is measured. If the measured time is below a higher predetermined threshold or between a higher and a lower predetermined threshold, a first operating mode is detected. The lower threshold could for example be one second and the higher threshold three seconds.

In one embodiment the first operating mode is determined using orientation data described above together with operating efficiency data. The operating efficiency data may comprise information relating to the power and/or revolutions per minute. In one embodiment the time which the chainsaw is using the highest power level or a power level above a threshold level is measured. If the measured time is between a higher and a lower predetermined threshold, a first operating mode is detected. The lower threshold could for example be 1 second and the higher threshold three seconds.

In one embodiment the first operating mode is determined using the recent activation history in combination with orientation data, operational efficiency data and time data. The recent activation history is generated in the controller 160 and subsequently stored in the memory. The information of the activation pattern can be used as data to for example estimate the present operating mode.

The second and third operating mode may be determined in the similar manners as been described with relation to the first operating mode but with different threshold values for data relating to inclination (orientation data), time (time data), vibration (vibration data), activation history and/or operational efficiency (operational efficiency data). The second operating mode may be the felling, where the felling cut is made and thus the threshold of inclination, time, operational efficiency, vibration and/or activation history should be set to correspond to the action of felling. Once the operating mode is detected to be felling, it is possible to gain operational data relating to the position of the trees being felled as well as the thickness of the tree.

The third operating mode may be limbing, where branches of the log are removed, and thus the threshold of data relating to inclination, time, operational efficiency, vibration and/or activation history should be set to correspond to the action of limbing. Once the operating mode is detected to be limbing, it is possible to gain operational data relating to the direction and elongation of the tree as well as the length of the tree. It may further be possible to determine how the thickness of the tree varies with its length.

As should be apparent from the skilled reader, the operating modes discussed may be determined using different combinations of data mentioned above. Hence, the operating modes could be determined using orientation data and time data, orientation data and operational efficiency data etc.

Furthermore, the above described exemplified embodiments may be used to determine other operational data than the operating modes.

In one embodiment the controller of the mobile terminal 200 is able to calculate operational data such as an approximation of the calorie consumption of the operator. The operational data relating to the calorie consumption may be determined using position data obtained from the position determining device together with operational data relating to the work being done as well as information from a accelerometer sensor arranged in the chainsaw 100. The position determining device gives information relating to the distance that has been walked during the work session. The accelerometer gives information relating to how much the chainsaw 100 has been lifted. Furthermore, the work being done can be used to help estimate the calorie consumption.

In one embodiment the data is sent from the controller of the chainsaw 100 to the controller of the mobile terminal 200, where operational data is determined. At least some of the operational data is then sent back to the controller of the chainsaw 100 to be shown in a user interface arranged on the chainsaw 100. The user interface may display a percentage of work being done, the current calorie consumption, the fuel or power level and the like. The user interface may for example comprise a light indicator such as LED, a speaker and/or a screen. The user interface may be arranged on the housing 110 of the chainsaw in a position which enables the user to easily see the display. The user interface may receive commands from the user such as to start the monitoring process, to reset the previous collected data etc.

Figure 5:
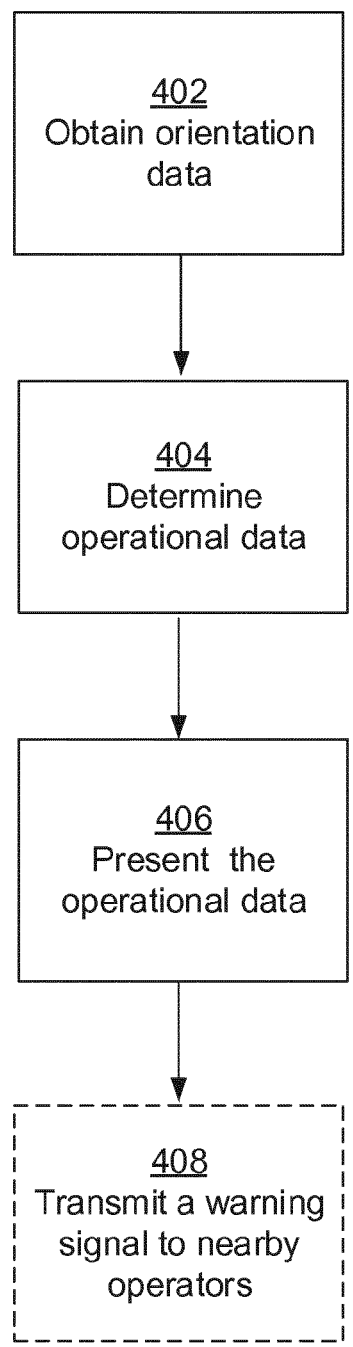
FIG. 5 shows a flowchart for a method for use in a handheld power tool according to one embodiment of the teachings of this application.

FIG. 5 shows an example method that the controller 164, according to one embodiment, is configured to execute. The controller 160 is configured to obtain 402 at least data. The data is at least obtained from the orientation sensor 150, but may also be obtained from a position determining device, a power unit sensor, a time measurement system and/or from a vibration sensor.

In one embodiment the controller 210 is arranged in a mobile device 200 having a position determining device. The data generated from the chainsaw, e.g. the orientation data from the orientation sensor 150, operational efficiency data from the a power unit sensor, time data from a time measurement system and/or vibration data from a vibration sensor is transmitted to the controller of the mobile terminal where it is processed together with the data generated from the mobile phone itself (for example from the position determining device).

In a next step the controller determines 404 operational data based on the data. In one embodiment the controller which determines the operational data is arranged in the mobile phone 200.

In a next step, the controller then presents 406 the operational data to the user. In one embodiment the operational data is presented in the display 220 of the mobile device 200. The information may be presented as raw data or as processed data where the information is presented in a graph, as seen in FIGS. 4*a-b*. The owner of the mobile terminal may be anybody having an interest of receiving operational data from the power tool 100.

In yet one embodiment, the operational data is sent from the controller 160 in the chainsaw to the user interface 168 of the chainsaw 100. The user interface 168 of the chainsaw 100 produces a signal containing the operational data, which is detectable by the user. The operational data is thus only shown to the operator of the power tool 100.

In yet one embodiment, the operational data is generated in the controller 160 of the chainsaw 100. The operational data is then presented in the mobile terminal 200 by transmitting 406 a signal from the controller 160 of the chainsaw 100 to the communication interface 164 of the chainsaw. The communication interface 164 of the chainsaw 100 then wirelessly transmits a signal, comprising the operational data, to the mobile terminal 200. The owner of the mobile terminal may be anybody having an interest of receiving operational data from the power tool 100.

Furthermore, in an optional step 408 the controller 160 may send out a wireless warning signal to nearby operators. In one embodiment the controller 160 of the chainsaw 100 sends out the wireless signal. In yet another embodiment the controller of the mobile terminal 200 sends out the wireless signal.

The benefits of such warning signal will now be described. When felling tree it is common, and recommended, not being the only operator working in that area at that time. The possibly high amount of people working in the forest increases the risk of getting hurt by another operator's chainsaw. Hence, it would be beneficial if the active chainsaw 100 automatically sends out some kind of warning signals in the present area, the hazard zone, when being used. Once the controller 160 receives information indicating that the chainsaw 100 is in an active state in a certain area the controller 160 will transmit a signal to the communication interface 164 to send out a wireless warning signal to nearby operators. The warning signal may be sent as a single signal as soon as the power tool is activated, but the signal may also be sent out continuously during the use of the power tool 100.

The warning signal may be sent via Bluetooth and may be received by the nearby operators through their ear protections or helmets having a communication interface. The signal could be in the form of an audible signal such as siren, a haptic signal such as a vibration, a visual signal such as a strobe light or other sensory alarm that could be arranged on an operator in the form of a helmet or ear protection.

The area that is considered the hazard zone may depend on user settings. In an area where the sight is good and only a few trees exist, the hazard zone for each operator could be smaller. However, if the tree felling is taken place in a foggy, bushy forest the risk of not seeing the other operators is higher and thus the area of the hazard zone could be bigger. If using Bluetooth the range of the hazard zone could maximum be around 100 meters, however if another communication interface is used larger hazard areas could be achieved.

In one embodiment the power tool 100 has a radio frequency alert interface. The radio frequency alert interface is configured to be communicatively connected to an external device, such as an earmuff. The radio frequency alert interface may be connected to more than one external device, so that alerts may be given to more than one person, thereby increasing the safety in the general area, especially when persons are wearing ear protections. The radio frequency alert interface may be connected directly to the ear protections or through a router. The router may also be connected to a server keeping track of the tree felling activities. For example, if the power tool is arranged in communication with a GPS, the server may determine which trees or where trees have been felled, and in any case how many trees that have been felled and at what rate.

As has been mentioned above, the processing of the data may be performed by the controller of the handheld power tool—at least partially and/or by a controller of the smart phone. The smart phone then receives data from the handheld power tool—or rather the orientation sensor—and processes this to determine the data. The processing of the orientation data, and also other data related to engine speed, location etc as has been discussed in the above, may be performed fully or partially in the smart phone whereby the smart phone receives orientation data that is only or at most partially processed. The processing of the orientation data, and also other data related to engine speed, location etc as has been discussed in the above, may be performed fully or partially in controller of the handheld power tool, whereby the data is transmitted to the smart phone for final processing or simply for presentation. No difference between these modes have been made herein and all controllers are simply referred to as one and the same controller. As would be apparent to a person skilled in computer processing there exist many variation in where exactly to process what data and to cover all possibilities in one application is an undue burden and that may be accomplished without undue experimentations by a skilled person.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A handheld power tool comprising:
   an orientation sensor;
   a power unit sensor configured to generate power data indicative of a power being output by the handheld power tool; and
   a time measurement system configured to generate time data;
   wherein the handheld power tool is configured to be operatively connected to a controller and a position determining device, wherein the controller is configured to:
   receive orientation data from the orientation sensor, wherein the orientation data comprises information indicative of an angle of operation of a portion of the handheld power tool;
   receive position data from the position determining device, the position data indicating a position of the handheld power tool;
   receive the time data generated by the time measurement system;
   determine a duration of time that the handheld power tool operated above a power threshold during performance of an operation based on the time data at a location indicated by the position data and the power data; and
   determine, based on at least the orientation data, the position data, and the duration of time that the handheld power tool operated above the power threshold, that an operation has been performed to fell a tree, a tree location for the tree, and a thickness of the tree that has been felled.

2. The handheld power tool according to claim 1, wherein the controller is arranged in a mobile terminal, the mobile terminal being in wireless communication with the handheld power tool.

3. The handheld power tool according to claim 2, wherein the orientation data is transmitted from the handheld power tool to the mobile terminal through a wireless communication interface arranged in the handheld power tool.

4. The handheld power tool according to claim 1, wherein the controller is arranged in the handheld power tool.

5. The handheld power tool according to claim 1, wherein a user interface comprises a speaker capable of generating an audible signal to the user and/or a visual indicator generating a signal visible to the user.

6. The handheld power tool according to claim 1, wherein the handheld power tool is a chainsaw.

7. The handheld power tool according to claim 1, wherein the controller is comprised in a mobile telephone.

8. The handheld power tool according to claim 1 further comprising a vibration sensor configured to generate vibration data;
wherein the controller is further configured to:
receive the vibration data generated by the vibration sensor; and
determine a vibration pattern of the handheld power tool during performance of the operation based on the vibration data; and
wherein the controller is further configured to determine the operational data based on the vibration pattern of the handheld power tool during performance of the operation.

9. The handheld power tool according to claim 1, wherein the handheld power tool comprises a chainsaw, the chainsaw comprising a guide bar and a chain, the chain being configured to be driven around the guide bar to perform a cutting operation by the handheld power tool;
wherein the orientation sensor is disposed within or on the guide bar.

10. The handheld power tool according to claim 1 further comprising a housing, a power unit, and a housing orientation sensor;
wherein the power unit is disposed within the housing;
wherein the housing orientation sensor is disposed within or on the housing, and the housing orientation sensor is configured to generate housing orientation data during performance of the operation; and
wherein the controller is further configured to determine the operational data based on the housing orientation data.

11. The handheld power tool of claim 1, wherein the controller is further configured to:
continue to receive updated orientation data, updated position data, updated power data, and updated time data; and
based upon the updated orientation data, the updated position data, the updated power data, and the updated time data, determine thicknesses of the tree that has been felled along a length of the tree based on determination of post-felling bucking cuts of the tree.

12. The handheld power tool of claim 1, wherein the controller is further configured to determine, based on the orientation data, that the operation is one of a first hinge cut, a second hinge cut, or a tree felling cut.

13. The handheld power tool of claim 12, wherein the orientation data indicates:
a substantially horizontal cut for the tree felling cut, and
an angled downwards cut is one of the first or second hinged cuts and an angled upwards is the other of the first or second hinged cuts.

14. A method for a controller operatively connected to a handheld power tool, the handheld power tool comprising an orientation sensor and a power unit sensor, the method comprising:
receiving power data indicative of a power being output by the handheld power tool;
receiving orientation data from the orientation sensor, wherein the orientation data comprises information indicative of an angle of operation of a portion of the handheld power tool;
receiving position data from a position determining device, the position data indicating a position of the handheld power tool;
receiving time data from a time measurement system;
determining a duration of time that the handheld power tool operated above a power threshold during performance of an operation based on the time data at a location indicated by the position data and the power data; and
determining, based on at least the orientation data, the position data, and the duration of time that the handheld power tool operated above the power threshold, that an operation has been performed to fell a tree, a tree location for the tree, and a thickness of the tree that has been felled.

15. The method of claim 14, wherein the handheld power tool further comprises a wireless communication interface or a user interface, wherein the method further comprises:
transmitting the operational data to a mobile terminal through the wireless communication interface or
transmitting the operational data to the user interface for producing a signal containing detectable operational data that is detectable by a user of the handheld power tool.

16. A handheld power tool comprising:
an orientation sensor; and
a power unit sensor configured to generate power data indicating a number of revolutions of a working assembly of the handheld power tool;
a time measurement system configured to generate time data;
wherein the handheld power tool is configured to be operatively connected to a controller and a position determining device, wherein the controller is configured to:
receive orientation data from the orientation sensor, wherein the orientation data comprises information indicative of an angle of operation of a working assembly of the handheld power tool;
receive position data from the position determining device, the position data indicating a position of the handheld power tool;
receive the time data generated by the time measurement system;
receive the power unit sensor data and determine a relationship of the power data to a revolutions per minute (RPM) threshold profile during performance of an operation based on the time data at a location indicated by the position data and the power data; and
determine, based on at least the orientation data, the position data, and the relationship of the power data to the RPM threshold profile, that an operation has been performed to fell a tree, a tree location for the tree, and a thickness of the tree that has been felled.

17. The handheld power tool of claim 16, wherein an RPM of the working assembly of the handheld power tool during performance of the operation indicates a decrease in the RPM while the handheld power tool is at a constant power usage during performance of the operation.

18. The handheld power tool of claim 16, wherein the RPM threshold profile comprises one or more RPM thresholds.

* * * * *